United States Patent
Vyssotski et al.

(10) Patent No.: US 7,111,180 B2
(45) Date of Patent: Sep. 19, 2006

(54) INFORMATION HANDLING SYSTEM INTERRUPTING CURRENT TO EXTERNAL MODULE IF CURRENT EXCEEDS DIFFERENT CURRENT LIMITS WHEN HANDLING SYSTEM RECEIVES CURRENT FROM BATTERY AND ALTERNATING CURRENT SOURCE

(75) Inventors: Nikolai V. Vyssotski, Elgin, TX (US); Daniel W. Kehoe, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 10/652,458

(22) Filed: Aug. 29, 2003

(65) Prior Publication Data

US 2005/0050370 A1 Mar. 3, 2005

(51) Int. Cl.
*G06F 1/26* (2006.01)
(52) U.S. Cl. ...................... 713/300; 713/310
(58) Field of Classification Search ................ 713/300, 713/301
See application file for complete search history.

(56) References Cited

U.S. PATENT DOCUMENTS

| | | | | |
|---|---|---|---|---|
| 4,868,817 A | * | 9/1989 | Shigihara | 714/47 |
| 5,327,016 A | * | 7/1994 | Su et al. | 307/128 |
| 5,485,073 A | | 1/1996 | Kasashima et al. | |
| 5,652,891 A | * | 7/1997 | Kitamura et al. | 713/324 |
| 5,712,754 A | * | 1/1998 | Sides et al. | 361/58 |
| 6,075,345 A | * | 6/2000 | Lee | 320/138 |
| 6,130,813 A | | 10/2000 | Kates et al. | |
| 6,163,131 A | | 12/2000 | Gartstein et al. | |
| 6,215,633 B1 | * | 4/2001 | Galecki et al. | 361/93.9 |
| 6,252,375 B1 | * | 6/2001 | Richter et al. | 320/127 |
| 6,346,794 B1 | | 2/2002 | Odaohhara | |
| 6,429,626 B1 | | 8/2002 | Konno et al. | |
| 6,456,948 B1 | | 9/2002 | Lim | |
| 6,472,848 B1 | * | 10/2002 | Stryker et al. | 320/135 |
| 6,509,717 B1 | | 1/2003 | Lee | |
| 6,516,418 B1 | * | 2/2003 | Lee | 713/320 |
| 6,526,516 B1 | * | 2/2003 | Ishikawa et al. | 713/340 |
| 2002/0099962 A1 | * | 7/2002 | Nakamura | 713/300 |

OTHER PUBLICATIONS

Compaq Computer Corporation, Intel Corporation, Microsoft Corporation, Phoenix Technologies Ltd., Toshiba Corporation, "Advanced Configuration and Power Interface Specification", pp. 1-43, 126, 236-276, 293-316 and 317-328, Oct. 11, 2002.

Embedded.com, "How to Talk Smart".

Weissel, Andreas, Bellosa, Frank, Process Cruise Control, Event-Driven Clock Scaling for Dynamic Power Management.

Duracell, Inc. and Intel Corporation, "Smart Battery Data Specification", Feb. 15, 1995.

* cited by examiner

*Primary Examiner*—Chun Cao
(74) *Attorney, Agent, or Firm*—Haynes and Boone, LLP

(57) ABSTRACT

A portable information handling system (IHS) includes an external module which derives its power from the internal unregulated DC power rail of the IHS. An IHS power subsystem includes a multiple threshold current protection circuit which continuously monitors power usage by the external module. The multiple threshold current limit protection circuit dynamically adjusts the current limit depending on whether the IHS is powered by an AC source or a DC battery source.

21 Claims, 5 Drawing Sheets

INFORMATION HANDLING SYSTEM INTERRUPTING CURRENT TO EXTERNAL MODULE IF CURRENT EXCEEDS DIFFERENT CURRENT LIMITS WHEN HANDLING SYSTEM RECEIVES CURRENT FROM BATTERY AND ALTERNATING CURRENT SOURCE

BACKGROUND

The disclosures herein relate generally to information handling systems and more particularly to a portable information handling system providing power to an external module and employing a current limit protection circuit for the external module.

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems (IHS's) often include external modules such as CD Read, CD Read/Write, DVD Drives and floppy disk drives, for example. The external modules typically derive their power from the unregulated DC power circuitry within the IHS, thereby placing a power drain on the resources of the IHS power subsystem. It is desirable that the IHS provide protection from an over-current state by placing a limit on the amount of power which the external modules draw.

Prior information handling systems have relied on current interrupting devices such as constant current fuses to limit the amount of power to external modules and to protect the critical power levels within the IHS. This method has been shown to be inadequate do to the large variation in current drain associated with the wide variety of external modules and the associated unpredictable power usages of these external modules. In addition, the current drain associated with each external module is affected by the voltage of the supply within the IHS. The power source of the IHS may be the AC mains or a battery powered DC source. One AC source that is used for IHS power in a fixed location is an AC adapter which provides an unregulated DC source to the internal main DC unregulated power rail of the IHS. Typical DC power sources that are used for an IHS to operate in a portable mode are nickel metal hydride batteries and lithium ion batteries. When an IHS is powered by batteries, variations in voltage occur at the main DC unregulated power rail due to the variable voltage associated with DC batteries conditional upon the level of charge.

One additional problem with the above constant current fuse approach is that selecting a single current value for the current limit does not allow the IHS to function over a full range of AC adapter output DC voltages and battery DC voltages as well as the wide range of external module power requirements. The portable IHS is left vulnerable to excessive current drain by the external module and subsequent external module faults (shorts) which could potentially cause system shutdowns and data loss.

What is needed is an information handling system which is capable of supplying power to an external module while accommodating a wide range of AC adapter output DC voltages and battery DC voltages.

SUMMARY

Accordingly, in one embodiment, a method of operating an information handling system (IHS) is provided that includes sensing whether the IHS is drawing power from a DC power source or an AC power source. The method also includes interrupting current to an external module of the IHS if, when the IHS is drawing power from a DC power source, the current to the external module exceeds a first current limit. The method further includes interrupting current to the external module if, when the IHS is drawing power from an AC power source, the current to the external module exceeds a second current limit.

In another embodiment, an information handling system (IHS) is disclosed which includes a main subsystem including a processor and a memory coupled to the processor. The IHS also includes an external module. A power subsystem is coupled to the main subsystem and the external module. The power subsystem supplies DC current to the main subsystem and the external module. Moreover, the power subsystem interrupts DC current to the external module if, when the IHS is drawing power from a DC power source, the current to the external module exceeds a first current limit. The power subsystem also interrupts DC current to the external module if, when the IHS is drawing power from an AC power source, the current to the external module exceeds a second current limit.

A principal advantage of the embodiment disclosed herein is that the main DC system unregulated power of the IHS is protected over a wider range of external module power uses. Moreover, the current limit level of the external modules need not be unduly restricted due to the differences associated with the primary power source, either AC or DC battery, within the IHS.

DETAILED DESCRIPTION

Figure 1:
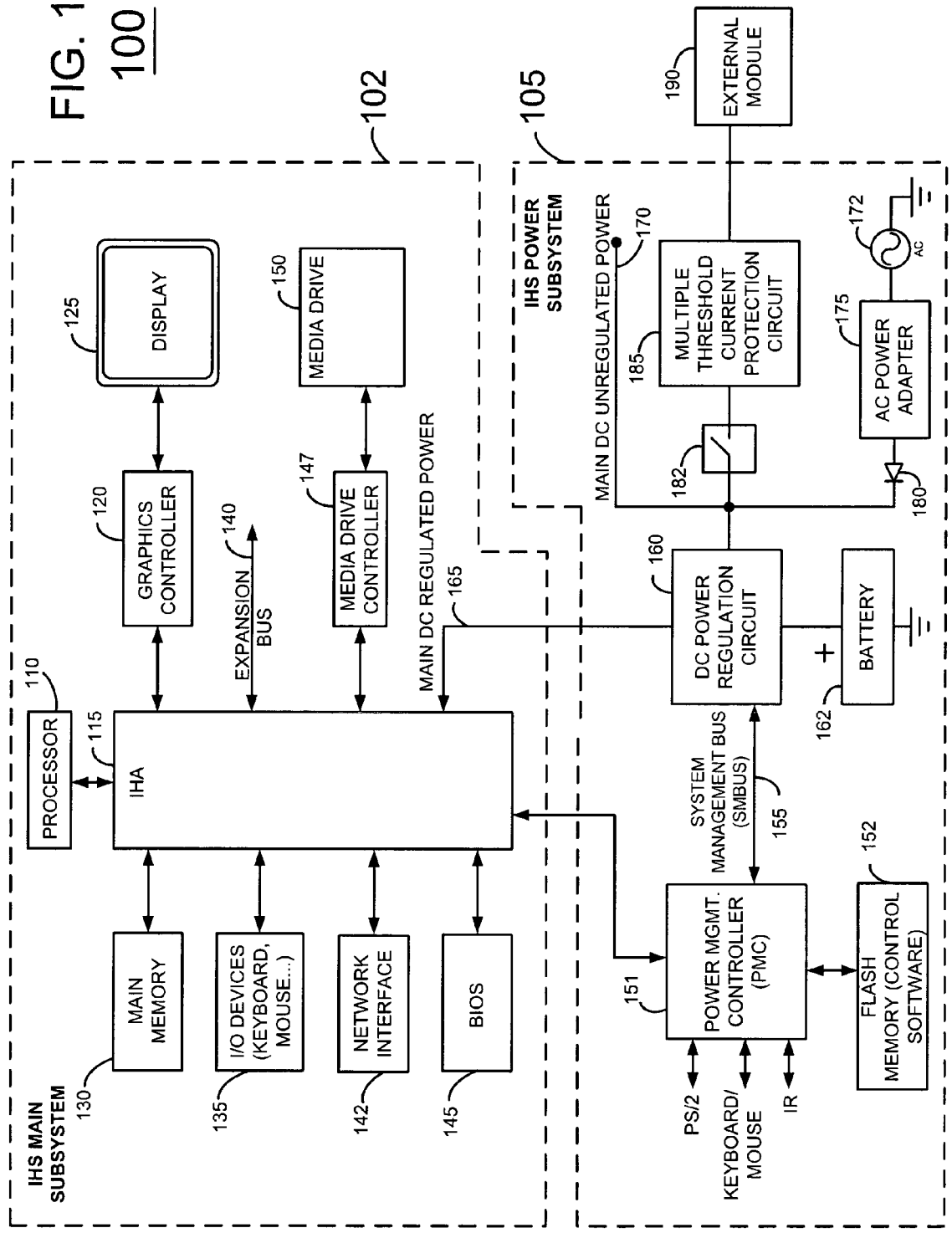
FIG. 1 is a block diagram of an embodiment of the disclosed information handling system (IHS) including an IHS main subsystem and an IHS power subsystem having a multiple threshold current protection circuit coupled to an external module.

FIG. 1 is a block diagram of the disclosed information handling system 100 which solves the above-described problems. Information handling system 100 is an example of one system in which the disclosed technology is practiced. For purposes of this disclosure, an information handling system may include instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As seen in FIG. 1, information handling system (IHS) 100 includes an IHS main subsystem 102 coupled to an IHS power subsystem 105. IHS main subsystem 102 includes a processor 110 such as an Intel Pentium series processor or one of many other processors currently available. An Intel Hub Architecture (IHA) chipset 115 provides information handling main subsystem 102 with graphics/memory controller hub functions and I/O functions. More specifically, IHA chipset 115 acts as a controller which communicates with a graphics controller 120 coupled thereto. A display 125 is coupled to the graphics controller 120. IHA chipset 115 further acts as a controller for main memory 130 which is coupled thereto. IHA chipset 115 also acts as an I/O controller hub (ICH) which performs I/O functions. Input devices 135 such as a mouse, keyboard, and tablet, are also coupled to chipset 115 at the option of the user. An expansion bus 140, such as a Peripheral Component Interconnect (PCI) bus or a PCI Express (PCIE) bus for example, is coupled to chipset 115 as shown. Expansion bus 140 includes one or more expansion slots (not shown) for receiving expansion cards which provide IHS main subsystem 102 with additional functionality. A local area network (LAN) controller 142, alternatively called a network interface controller (NIC), is coupled to IHA chipset 115. System basic input-output system (BIOS) 145 is also coupled to IHA chipset 115 as shown. A media drive controller 147 such as an integrated drive electronics (IDE) controller is coupled to IHA chipset 115 so that devices such as media drive 150 can be connected to processor 110 and other components of the system. Devices that can be coupled to media drive controller 147 include hard disk drives, CD-ROM drives, DVD drives and other fixed or removable media drives.

A power management controller (PMC) 151 is part of an IHS power subsystem 105 that is coupled to IHA chipset 115 to provide communication between processor 110 and IHS power subsystem 105. A microcontroller is typically employed as power management controller 151. A nonvolatile memory 152, such as FLASH memory for example, is coupled to power management controller 151 to provide control software therefor. Power management controller 151 communicates through a system management bus (SMBus) 155 to a DC power regulation circuit 160 coupled thereto. Battery 162 is coupled to DC power regulation circuit 160 which operates in conjunction with battery 162 to provide regulated main DC power at power lines 165 to IHS power subsystem 105 and IHS main subsystem 102. In one embodiment, these main DC power lines 165 provide IHS 100 with regulated DC voltages such as 5.0 volts and 3.3 volts. DC power regulation circuit 160 includes charge and discharge circuitry (not shown separately) for battery 162.

Main DC unregulated power is provided to main DC unregulated power output 170 located at the output of DC power regulation circuit 160. Main DC unregulated power output 170 receives energy either from DC power source battery 162 or external AC power source 172 which is coupled to AC power adapter 175. AC adapter 175 converts AC from AC source 172 to unregulated DC in one embodiment. The resultant unregulated DC power is transmitted through a protection diode 180 to provide unregulated DC power to output 170. Main DC unregulated power output 170 is coupled via power cut-off switch 182 to multiple threshold current protection circuit 185 which will be discussed later in greater detail. A power FET can be used as cut-off switch 182. External module 190 is coupled to multiple threshold current protection circuit 185 and is supplied DC power thereby. Examples of typical external modules 190 include CD ROM drives, CD-R/W drives, DVD drives, floppy drives as well as other power consuming devices which provide additional functionality to IHS.

Figure 2:
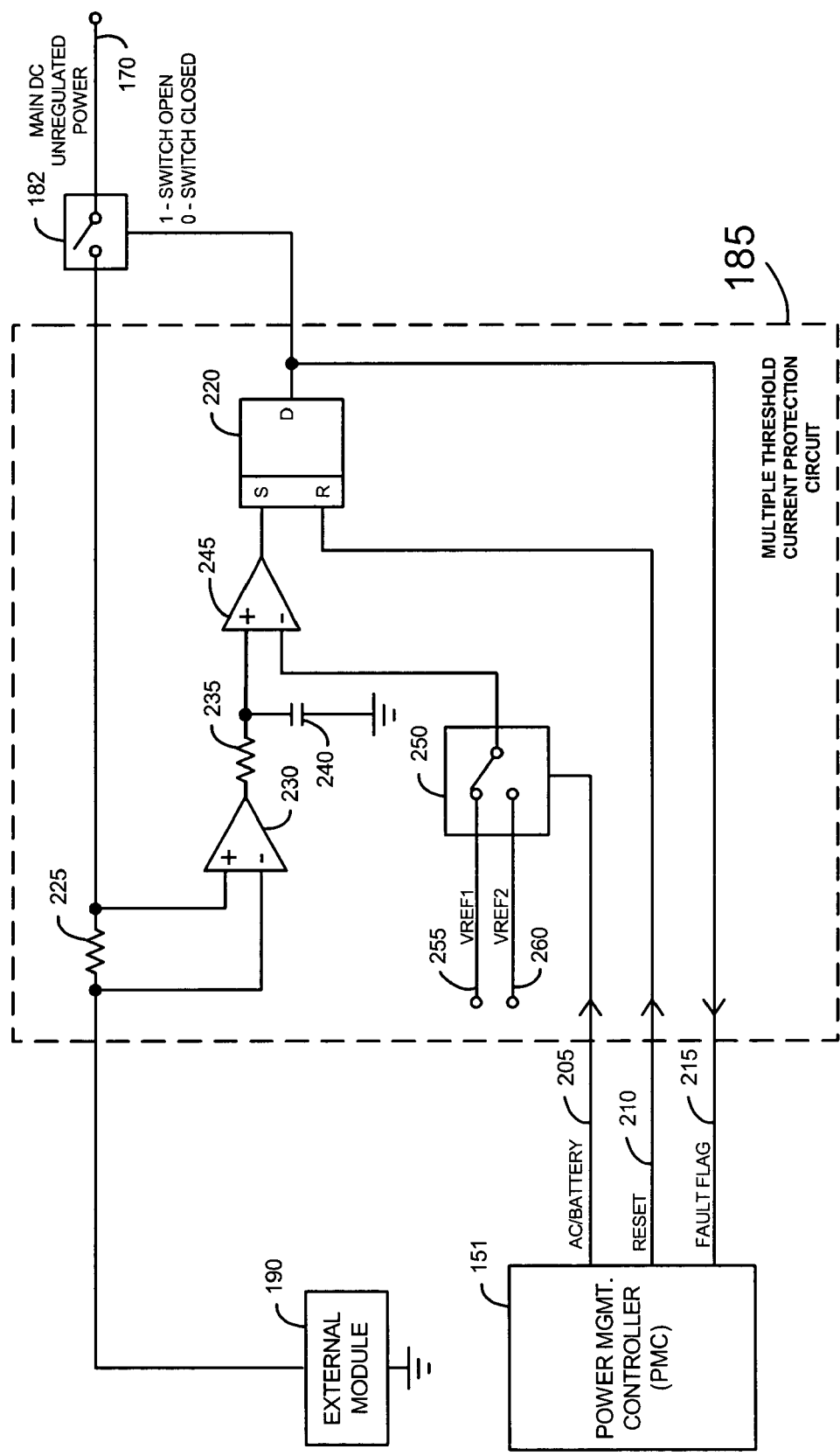
FIG. 2 is a hardware block diagram of an embodiment of the multiple threshold current protection circuit used in the IHS of FIG. 1.

FIG. 2 shows a detailed representation of one multiple threshold current protection circuit 185 that can be employed in IHS 100. Power management controller (PMC) 151 (shown earlier in FIG. 1) supplies the following signals to multiple threshold current protection circuit 185. PMC 151 supplies an AC/BATTERY signal to an AC/BATTERY input 205 and a RESET signal to a RESET input 210. The AC/BATTERY signal indicates whether the IHS is currently being power by AC power adapter 175 or DC battery 162. The RESET signal instructs protection circuit 185 when to reset as explained later in more detail. A FAULT FLAG signal is generated by multiple threshold current protection circuit 185 and is supplied to PMC 151 by FAULT FLAG output 215.

When IHS 100 commences operation, power management controller (PMC) 151 initiates a reset of multiple threshold current protection circuit 185 via the RESET input signal supplied to RESET input 210. The RESET input signal at RESET input 210 is fed to the reset input (R) of a set/reset latch 220. The output (D) of set/reset latch 220 drives cut-off switch 182 closed which couples the main DC unregulated power output 170 through switch 182 and resistor 225 to provide external module 190 with unregulated DC power. Cut-off switch 182 is implemented as an FET power switch. When cut-off switch 182 is closed, main DC unregulated power output 170 is coupled to external module 190. However, when a fault or over-current condition occurs, as discussed later, cut-off switch 182 is opened to disconnect external module 190 from main DC unregulated power output 170.

The scenario wherein cut-off switch 182 is closed after IHS initiation is presently considered. The voltage drop across resistor 225 is proportional to the current driving external module 190 and thus gives an indication of that current. The voltage drop across resistor 225 is sensed by coupling one terminal of the resistor to the negative input of a current amplifier 230 and the remaining terminal of the resistor to the positive input of current amplifier 230. The output of current amplifier 230 is a voltage directly proportional to the current drain of external module 190 and is coupled to a low pass filter first formed by resistor 235 and capacitor 240 as shown. The output of resistor 235 is a voltage reference directly proportional to the current draw of external module 190 and is made less susceptible to short transient signal noise by the low pass filter just described.

The output of resistor 235 is coupled to the positive input of a comparator 245. The output of threshold switch 250 is coupled to the negative input of comparator 245. In this embodiment, threshold switch 250 is capable of selecting two different reference threshold voltages for comparator 245. Comparator 245 compares the voltage developed as a result of the current draw of external module 190 (as supplied to its positive terminal) and the reference voltage at the output of threshold switch 250 (as supplied to its negative terminal). The voltage supplied to switch 250 can be either reference voltage VREF1 which is supplied to switch terminal 255 or reference voltage VREF2 which is supplied to switch terminal 260. One or the other of these two reference voltages is selected depending on whether IHS 100 is being supplied power by battery 162 or AC power adapter 175 as indicated by the AC/BATTERY signal supplied to threshold switch 250. It is noted that reference voltage VREF1 is associated with a current limit REF1 and reference voltage VREF2 is associated with a different current limit REF2. Thus, when IHS 100 is supplied by AC power, then VREF1 with its associated REF1 current limit is selected, and when IHS 100 is supplied by DC battery power, then VREF2 with its associated REF2 current limit is selected.

More particularly, when IHS 100 is powered by AC power adapter 175, power management controller (PMC) 151 generates a high on the AC/BATTERY input signal at input 205. This action drives reference threshold switch 250 to select VREF1 as the input to switch 250. VREF1 is the reference voltage to be used when IHS 100 is powered by AC power adapter 175. In contrast, when IHS 100 is powered by DC battery 162, PMC 151 generates a low AC/BATTERY signal at input 205. This action causes switch 250 to select VREF2 signal as its source. VREF2 is the reference voltage to be used when IHS 100 is powered by DC battery 162. VREF1 and VREF2 are different reference voltages appropriate for AC power and DC battery power respectively. In one embodiment, VREF2 is 1.7 volts and VREF2 is 3 volts although other threshold voltages can be employed specific to the particular implementation. In one embodiment, if op amp 230 exhibits 1 volt/1 amp gain, then current limit REF1 (for AC) is 1.7 amp and current limit REF2 (for DC) is 3.0 amp. The output of reference threshold switch 250 is coupled to the negative input of comparator 245. With a selected reference voltage established at the negative input of comparator 245, multiple threshold current protection circuit 185 is capable of comparing the current draw of external module 190 with a selected current limit (corresponding to current limited threshold voltages VREF1 or VREF2, whichever is selected). Comparator 245 determines if the selected current limit has been exceeded by the current draw of external module 190. If the selected limit has been exceeded, then switch 182 is opened to disconnect external module 190 from the IHS.

In more detail, when the current draw of external module 190 exceeds the selected current limit as determined by VREF1 or VREF2, comparator 245 transmits a signal to the set input (S) of latch 220 which sets the output of latch 220 low thus driving the FAULT FLAG signal at FAULT FLAG output 215 low. Because FAULT FLAG output 215 is coupled to PMC 151, the low FAULT FLAG signal is supplied to PMC 151 to inform the PMC that an over-current fault condition has occurred. In addition the output of latch 220 drives cut-oft switch 182 open, thereby removing the power source to external module 190 and protecting the main DC unregulated power output 170 within the IHS 100. The capability of providing a different current threshold or current limit for AC and DC power sources, respectively, is a significant feature of this embodiment.

Figure 3:
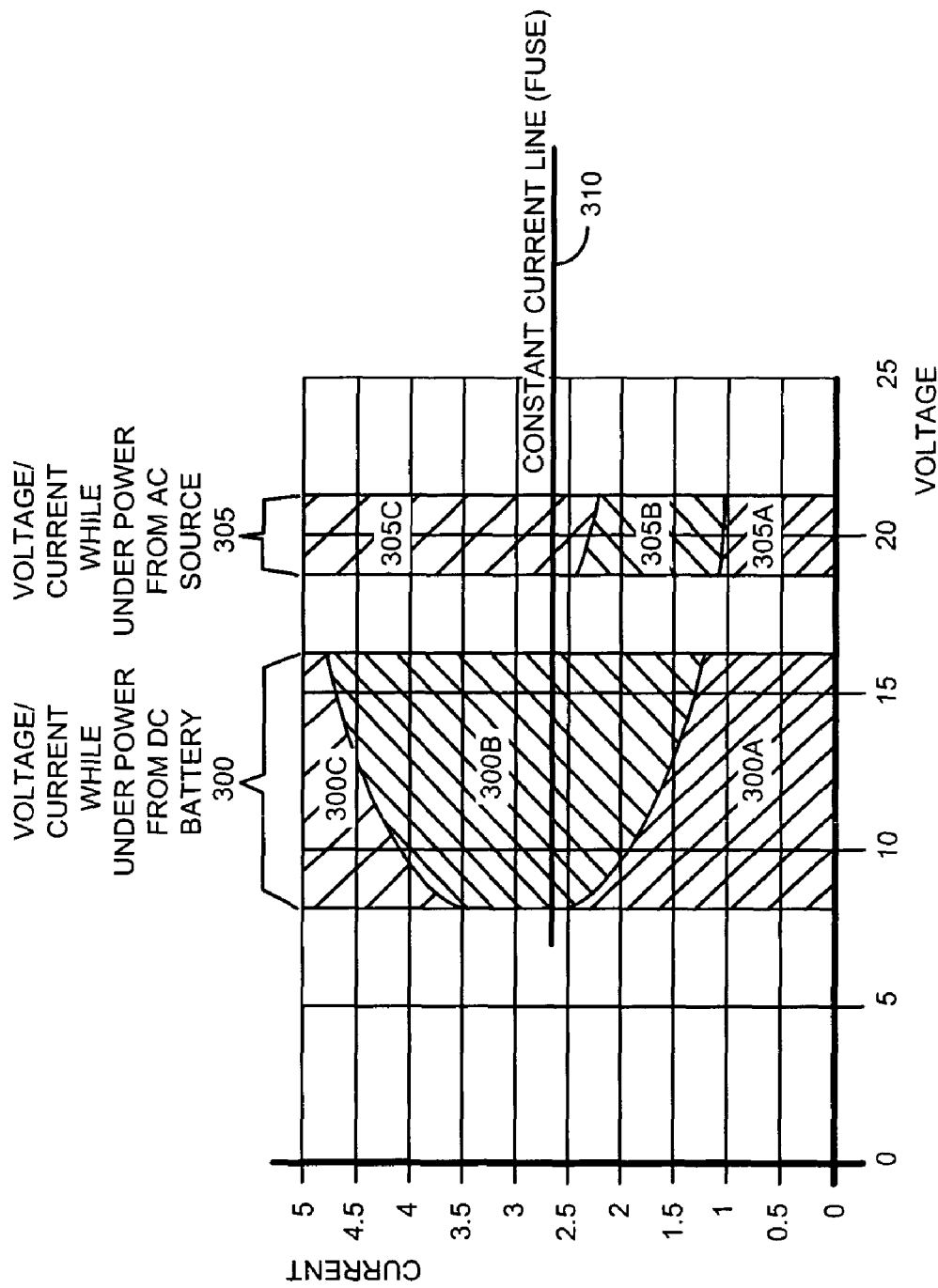
FIG. 3 is a power demand graph resulting when a constant current fuse is used in the IHS of FIG. 1 instead of the disclosed technology of FIG. 2.

FIG. 3 is a power demand graph showing the behavior of IHS 100 of FIG. 2 without the presence of multiple threshold protection circuit 185. More particularly, FIG. 3 is a power demand graph of an IHS wherein a constant current fuse (not shown) is employed in series with external module 190 to limit current to the external module without the benefit of protection circuit 185. The current drain by external module 190 is shown on the vertical axis. The voltage at the main DC unregulated power output or rail 170 is shown on the horizontal axis. In this particular example, the main DC unregulated power output or rail 170 is rated at 50 Watts derived from a power adapter 175.

The power demand graph of FIG. 3 includes two vertical voltage regions 300 and 305. Voltage region 300 represents voltages ranging from 8 to 16 volts DC, namely the working voltage range of main DC unregulated power output 170 while the IHS is powered by DC battery source 162. Voltage region 305 represents voltages ranging from 19 to 21 volts DC, namely the working voltage range of main DC unregulated power output 170 while the IHS is powered by AC power adapter 175.

The power demand graph of FIG. 3 includes three unique cross-hatched areas associated with each of voltage ranges 300 and 305 of the unregulated DC output 170. Cross-hatched region 300A represents the current and voltage relationships wherein external module 190 is in its normal operating range below its maximum allowed power draw.

Cross-hatched region 305A represents the current and voltage (or power) relationships wherein external module 190 is operating below power use region 305B for those times when IHS 100 is powered by AC power adapter 175. This is a safe state for the IHS to operate. Power use region 305B represents a fault condition for external module 190 in which maximum allowed power draw is exceeded, but the IHS is still operational. In this case, a fault condition in the external module can be detected without risking IHS shutdown due to power starvation.

Cross-hatched region 300B represents a normal power use region of typical power draw by external module 190 during normal operation when supply voltage is derived from DC battery source 162.

Cross-hatched region 300C represents the current and voltage relationships wherein the power source (battery or AC adapter) is driven beyond its ability to provide adequate power to the IHS and external module. Region 300C is a fault condition in which overload or brownout can cause IHS shutdown or malfunction.

Cross-hatched region 305C represents the current and voltage relationships where IHS 100 is again being driven beyond its ability to provide adequate current to external module 190, except that now IHS 100 is powered by AC power adapter 175.

As seen in the graph in FIG. 3 a constant current fuse selected to accommodate a safe working region within the voltage range of 8 to 16 volts (i.e. within region 300B) when the IHS is powered by DC battery 162 does permit a safe working current limit within the range of 19 to 21 volts (i.e. within region 305B) when the IHS is powered by AC power adapter 175. However, when constant current line 310 is drawn to represent the current limit associated with a constant current fuse as shown in FIG. 3, it passes through a safe region 300B which corresponds to safe operation when powered by the DC battery, but unfortunately also passes through unsafe region 305C when powered by the AC adapter. The selection of a current limit associated across all working voltages of areas 300B and 305B is not possible. This demonstrates the limitation of previous constant current fuse protection designs.

Figure 4:
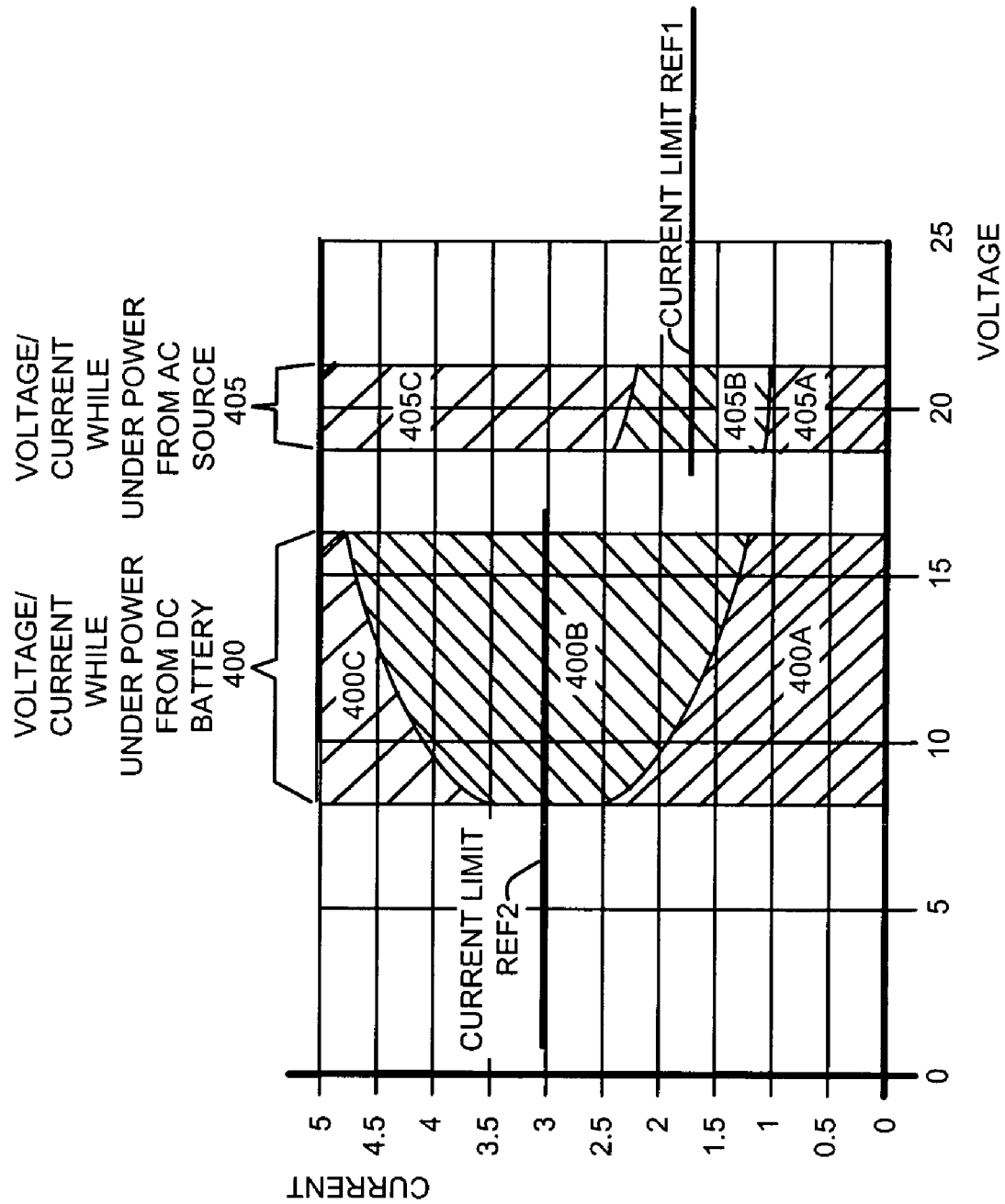
FIG. 4 is a power demand graph of the IHS of FIG. 1 when the disclosed technology of FIG. 2 is employed.

FIG. 4 above is a power demand graph similar to the graph of FIG. 3. However, two unique current limit values, REF1 and REF2 are employed for respective normal current operating regions 400B and 405B. In other words, one current limit value REF1 is employed while the IHS is operating on AC power from AC adapter 175 and another current limit value REF2 is employed when the IHS is operating on DC power from battery 162. Current limits REF1 and REF2 are associated with voltages VREF1 and VREF2, respectively. By having different threshold current limit values for AC and DC power regions, a safe working current range is maintained at main DC unregulated power output 170 for all power draws of external module 190. It is noted that when comparing the power demand graphs of FIG. 4 and FIG. 3, regions 400A, 400B and 400C of FIG. 4 correspond to regions 300A, 300B and 300C of FIG. 3. Also, regions 405A, 405B and 405C of FIG. 4 correspond to regions 305A, 305B and 305C of FIG. 3. Voltage ranges 400 and 405 of FIG. 4 correspond to voltage ranges 300 and 305 of FIG. 3.

Figure 5:
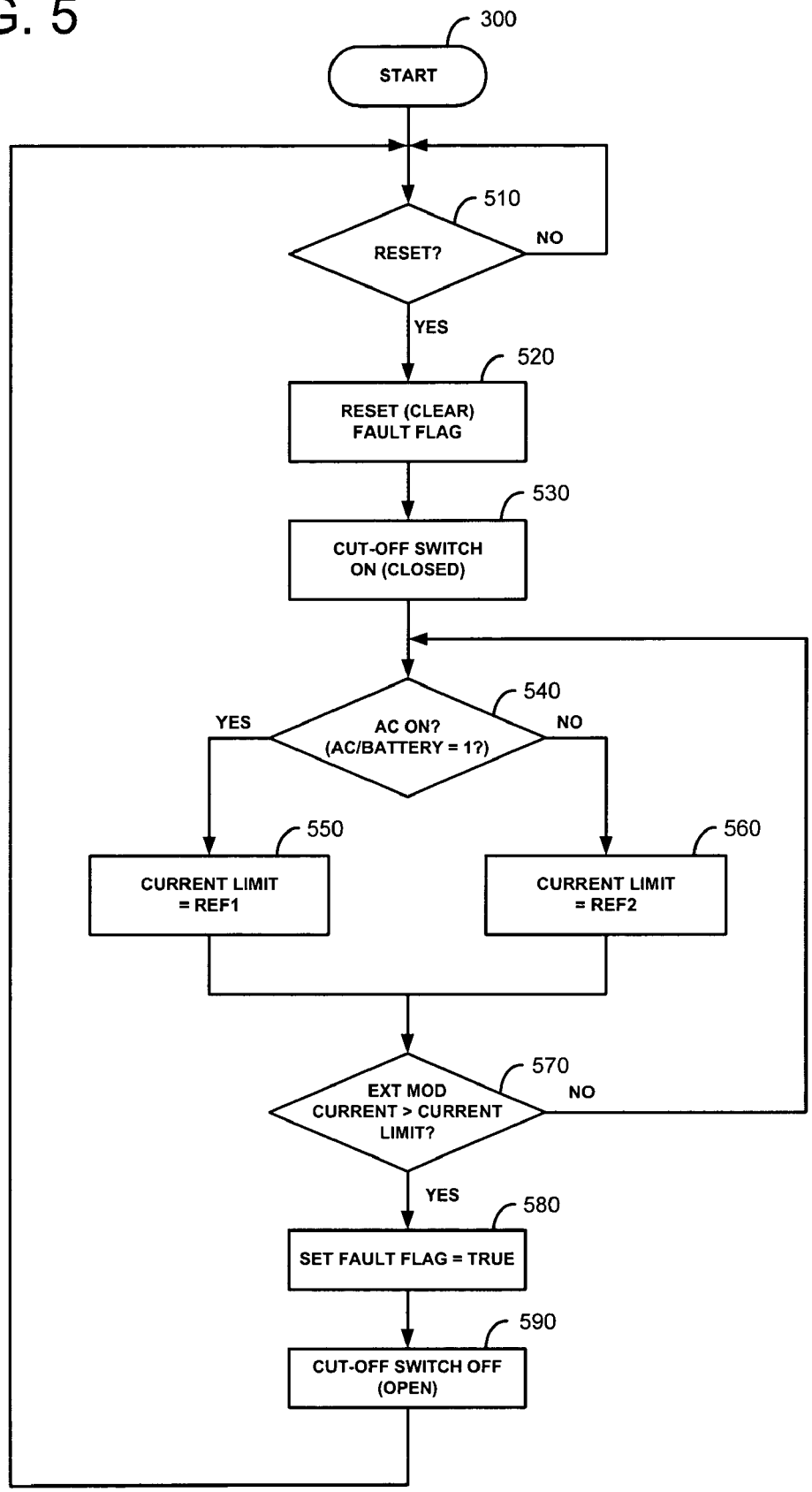
FIG. 5 is a flow chart showing hardware and software states associated with the multiple threshold current protection circuit employed in the IHS of FIG. 2.

FIG. 5 is a flow chart which represents the process flow of the IHS 100, PMC 151 and multiple threshold current protection circuit 185 in FIG. 2. It will be recalled that PMC 151 provides protection circuit 185 with an AC/BATTERY input signal which indicates whether the IHS is presently being powered by an AC power source or a DC battery power source. PMC 151 also provides protection circuit 185 with a RESET signal which resets protection circuit 185 when the IHS is first powered up or restarted. It will also be recalled that protection circuit 185 provides a FAULT FLAG output signal back to PMC 151. The FAULT FLAG output signal is generated by protection circuit 185 when external module 190 is drawing too much current or power.

IHS 100 is first turned on or restarted to initiate process flow as indicated by start block 300. Protection circuit 185 is then reset by PMC 151 providing a RESET signal to the reset input (R) of latch 220. A test is then conducted at decision block 510 to determine if protection circuit 185 has been reset. If protection circuit 185 has not yet been reset, then decision block 510 continues testing until such a reset does occur. Once PMC 151 requests a reset, such as upon starting or restarting IHS 100, the reset of latch 220 occurs and the FAULT FLAG is cleared as per block 520. Immediately upon clearing any previous faults, cut-off switch 182 is closed as per block 530. This action provides external module 190 and multiple threshold current protection circuit 185 with power from main DC unregulated power output 170.

A test is then conducted by protection circuit 185 at decision block 540 to determine if IHS 100 is powered by an AC or DC source. If IHS 100 is powered by AC power adapter 175, then the current limit of protection circuit 185 is set to REF1 as per block 550. This is achieved by connecting switch terminal 255 to a VREF1 voltage reference which corresponds to the current limit REF1. However, if it is found at decision block 540 that IHS 100 is being supplied power by a DC battery power source, then the current limit of protection circuit 185 is set to REF2 as per block 560. This is achieved by connecting switch terminal 260 to a VREF2 voltage reference which corresponds to the current limit REF2.

Assuming that the source of power for IHS 100 is AC power adapter 175 and that the REF1 current limit is selected, a test is conducted at decision block 570 to determine if the current draw associated with external module 190 is greater than the selected current limit REF1. IHS 100 is now in a state where external module 190 is drawing power from IHS power subsystem 105 and protection circuit 185 is monitoring the current draw of external module 190 to determine if the current draw is too high. If the current draw of the external module is not greater than the predetermined current limit REF1, then process flow will loop back to decision block 540. The loop thus formed will continue testing until the current draw of the external module exceeds the predetermined current limit REF1 at block 570. When this occurs, a fault condition exists which causes the FAULT FLAG signal to be set as per block 580 and cut-off switch 182 to be opened as per block 590. Thus, when this over-current fault condition occurs, power is cut off to external module 190. External module 190 is in effect disconnected from the IHS. Following this fault condition the system returns to a wait state at decision block 510 and waits until PMC 151 initiates a RESET and starts the process once more.

Assume however now that instead of being supplied power by AC power adapter 172, IHS 100 is in fact being supplied power by a DC battery source such that the REF2 current limit is selected. In this case a test is conducted at decision block 570 to determine if the current draw associated with external module 190 is greater than the selected current limit REF2. IHS 100 is now in a state where external module 190 is drawing power from IHS power subsystem 105 and protection circuit 185 is monitoring the current draw of external module 190 to determine if the current draw is too high. If the current draw of the external module is not greater than the predetermined current limit REF2, then process flow will loop back to decision block 540. The loop thus formed will continue testing until the current draw of the external module exceeds the predetermined current limit REF2 at block 570. When this occurs, a fault condition exists which causes the FAULT FLAG signal to be set as per block 580 and cut-off switch 182 to be opened as per block 590. Thus, as before, when an over-current fault condition exists, power is cut off to external module 190. External module 190 is again disconnected. Following this fault condition the system again returns to a wait state at decision block 510 and waits until PMC 151 initiates a RESET and starts the process once more.

An information handling system and method of operating the system are thus disclosed which are capable of providing DC power to external modules. The disclosed IHS dynamically determines the power source as being either AC or DC. The IHS dynamically selects different current threshold limits for the external module dependent on whether the power source is use is AC or DC. The disclosed IHS disconnects the power to the external module or modules when an over-current or fault condition appears.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of operating an information handling system (IHS) comprising:
   sensing whether the IHS is drawing power from a DC power source or an AC power source;
   interrupting current to an external module of the IHS if, when the IHS is drawing power from a DC power source, the current to the external module exceeds a first current limit of a first value associated with a first voltage; and
   interrupting current to the external module if, when the IHS is drawing power from an AC power source, the current to the external module exceeds a second current limit of a second value different from the first value and associated with a second voltage different from the first voltage.

2. The method of claim 1 wherein the DC power source is a battery.

3. The method of claim 1 wherein the AC power source is an AC adaptor.

4. The method of claim 1 wherein the external module is a media drive.

5. The method of claim 1 including initializing the IHS prior to sensing whether the IHS is drawing power from a DC power source or an AC power source.

6. The method of claim 5 including supplying current to a cut-off switch which is connected to the external module.

7. The method of claim 6 including closing the cut-off switch upon initializing the IHS to supply current to the external module.

8. The method of claim 6 wherein the cut-off switch is a power FET.

9. The method of claim 6 including opening the cut-off switch when the current to the external module is provided by a DC battery source and the current to the external module exceeds the first current limit.

10. The method of claim 6 including opening the cut-off switch when the current to the external module is provided by an AC power source and the current to the external module exceeds the second current limit.

11. An information handling system (IHS) comprising:
   a main subsystem including a processor and a memory coupled to the processor;
   an external module; and
   a power subsystem, coupled to the main subsystem and the external module, for supplying DC current to the main subsystem and the external module, the power subsystem interrupting DC current to the external module if, when the IHS is drawing power from a DC power source, the current to the external module exceeds a first current limit of a first value associated with a first voltage; and also interrupting DC current to the external module if, when the IHS is drawing power from an AC power source, the current to the external module exceeds a second current limit of a second value different from the first value and associated with a second voltage different from the first voltage.

12. The IHS of claim 11 wherein the power subsystem includes a cut-off switch which is coupled to the external module to supply current to the external module and to interrupt current to the external module.

13. The IHS of claim 12 wherein the cut-off switch is a power FET.

14. The IHS of claim 11 wherein the power subsystem includes a power management controller which determines if the IHS is being powered by a DC power source or an AC power source.

15. The IHS of claim 11 wherein the DC current is unregulated.

16. The IHS of claim 12 wherein the power subsystem includes a multiple threshold current protection circuit, coupled to the cut-off switch, for interrupting DC current to the external module if, when the IHS is drawing power from a DC power source, the current to the external module exceeds a first current limit; and also interrupting DC current to the external module if, when the IHS is drawing power from an AC power source, the current to the external module exceeds a second current limit.

17. The IHS of claim 16 wherein the power subsystem includes a power management controller which determines if the IHS is being powered by a DC power source or an AC power source.

18. The IHS of claim 17 wherein the power subsystem generates a fault flag if when the IHS is drawing power from a DC power source, the current to the external module exceeds a first current limit and if when the IHS is drawing power from an AC power source, the current to the external module exceeds a second current limit.

19. The IHS of claim 18 wherein the fault flag is provided to the power management controller.

20. The IHS of claim 19 wherein the multiple threshold protection circuit includes a sensor in series with the cut-off switch and the external module to sense the current supplied to the external module by the power subsystem.

21. An information handling system (IHS) comprising:
   a chassis;
   a main subsystem including a processor mounted in the chassis;
   a storage coupled to the processor;
   an external module; and
   a power subsystem, coupled to the main subsystem and the external module, for supplying DC current to the main subsystem and the external module, the power subsystem interrupting DC current to the external module if, when the IHS is drawing power from a DC power source, the current to the external module exceeds a first current limit of a first value associated with a first voltage, and also interrupting DC current to the external module if, when the IHS is drawing power from an AC power source, the current to the external module exceeds a second current limit of a second value different from the first value and associated with a second voltage different from the first voltage.

* * * * *